US010270298B1

(12) United States Patent
Gupta et al.

(10) Patent No.: US 10,270,298 B1
(45) Date of Patent: Apr. 23, 2019

(54) INTELLIGENT WIRELESS CHARGING SYSTEM

(71) Applicant: Dell Products L. P., Round Rock, TX (US)

(72) Inventors: Chitrak Gupta, Bangalore (IN); Jace W. Files, Round Rock, TX (US); Mainak Roy, Kolkata (IN); Aeiswarjya Pattnaik, Bangalore (IN); Rathi Babu, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/790,213

(22) Filed: Oct. 23, 2017

(51) Int. Cl.

| | |
|---|---|
| ***H02J 7/00*** | (2006.01) |
| ***H02J 50/90*** | (2016.01) |
| ***H02J 7/02*** | (2016.01) |
| ***G06F 17/30*** | (2006.01) |
| ***H01F 38/14*** | (2006.01) |
| ***H02J 50/10*** | (2016.01) |

(52) U.S. Cl.
CPC ........ *H02J 50/90* (2016.02); *G06F 17/30864* (2013.01); *H01F 38/14* (2013.01); *H02J 7/025* (2013.01); *H02J 50/10* (2016.02)

(58) Field of Classification Search
CPC . H02J 50/10; H02J 7/025; H02J 50/90; G06F 17/30864; H01F 38/14
USPC .......................................................... 320/108
See application file for complete search history.

(56) References Cited

U.S. PATENT DOCUMENTS 9,637,014 B2 * 5/2017 Schneider et al. ...... H02J 50/12
2014/0021908 A1 * 1/2014 McCool et al. ...... B60L 11/182 320/108
2014/0217966 A1 * 8/2014 Schneider et al. ...... H02J 50/12 320/108

* cited by examiner

*Primary Examiner* — Sun J Lin
(74) *Attorney, Agent, or Firm* — Campbell Stephenson LLP; Shiv S. Naimpally

(57) ABSTRACT

In some examples, a wireless charging system includes a pressure sensitive plate, a plurality of charging coils, and a base that includes one or more processors and logic instructions. The logic instructions are executable by the one or more processors to detect a device placed on the pressure sensitive plate, determine coordinates of a plurality of vertices of the device, determine an approximate location of a receiver of the device, identify one or more charging coils of the plurality of charging coils that are nearest to the receiver of the device, and activate the one or more charging coils that are nearest to the receiver of the device, without activating a remaining charging coils of the plurality of charging coils.

20 Claims, 10 Drawing Sheets

INTELLIGENT WIRELESS CHARGING SYSTEM

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current wireless charging systems can efficiently charge a device only when the charging coils in the mat are aligned with the power receiver in the device. Large charging mats for charging multiple devices may result in an increased time to charge each device when devices are not properly aligned, adversely affecting a user's experience. For example, if there is an alignment issue, then charging may not occur or may occur inefficiently. In addition, if a large charging mat has predefined areas for each device, a large device may not fit into the predefined area, resulting in slow charging because the receiver in the device is misaligned to the charging coils in the mat.

Some wireless charging mechanisms use multiple charging coils to create a large charging area, thereby using a significantly more amount of energy because power is supplied to more charging coils compared to a smaller charging area. In addition, when a device's receiver is not aligned (e.g., in close proximity) to a nearest charging coil, the device may take longer to charge and consume more energy.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a wireless charging system may include a pressure sensitive plate, a plurality of charging coils, and a base that includes one or more processors and logic instructions. The logic instructions may be executable by the one or more processors to detect a device placed on the pressure sensitive plate, determine coordinates of a plurality of vertices of the device, determine an approximate location of a receiver of the device, identify one or more charging coils of the plurality of charging coils that are nearest to the receiver of the device, and activate the one or more charging coils that are nearest to the receiver of the device, without activating a remainder of the plurality of charging coils. The one or more charging coils may be sufficiently near to the receiver to create inductive coupling with the receiver to enable the device to be efficiently charged.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
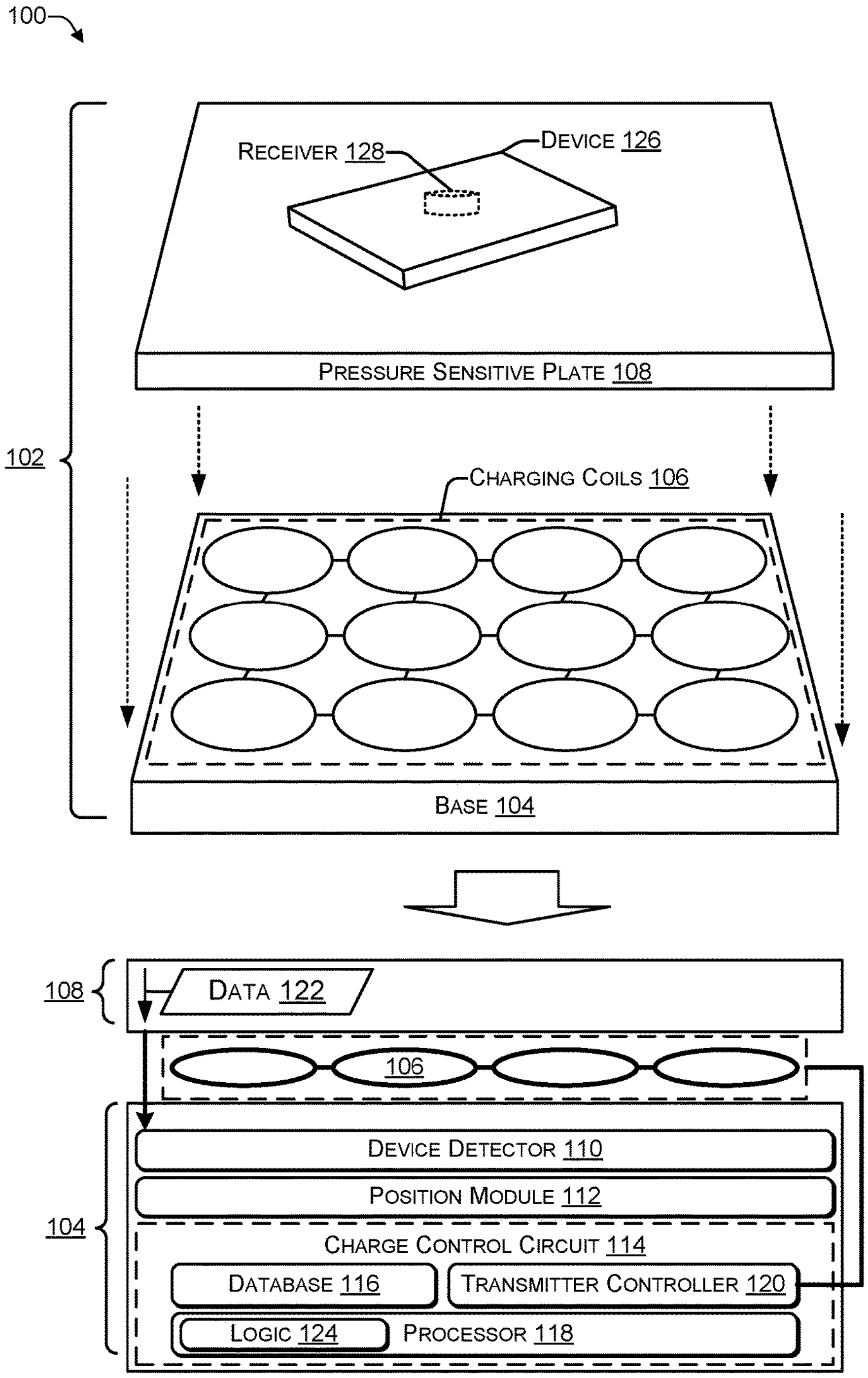
FIG. 1 is a block diagram illustrating an architecture of a charging system according to some implementations.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may be used to create an intelligent wireless charging system that is capable of efficiently charging one or more devices. For example, the wireless charging system may include a relatively large charging mat that is capable of charging multiple devices, including both large devices and small devices. Unlike conventional charging mats that have predefined areas demarcated for placing each device, the wireless charging system described herein may enable users to place devices, both large and small, anywhere on the large charging mat and in any position. The wireless charging system may use (1) a mesh of multiple geometrically-shaped charging coils and (2) a software algorithm executed by a processor. The charging coils may also be referred to as transmitters because the charging coils wirelessly transmit power to a receiver in each device. The software algorithm may identify one or more of the charging coils that are in close proximity to the power receiver in each device on the charging mat and activate the one or more charging coils to wirelessly transmit power and deactivate (or not activate) the remaining charging coils of the charging coil mesh. When a charging coil is activated, the charging coil may wirelessly transmit power. When a charging coil is not activated (e.g., inactive), the charging coil may not wireless transmit power. In this way, the wireless charging system may consume less power to charge the devices because all of the charging coils may not be active. In addition, each device may be charged relatively quickly because the software algorithm may identify and activate the charging coils in the wireless charging system that are in close proximity to the power receiver in each device. An intensity of electromagnetic radiation, such as wirelessly transmitted power, is inversely proportional to the square of the distance from the source of electromagnetic radiation. Thus, halving the distance between a charging coil in the wireless charging system and a receiver in the device may result in an approximate squaring of the amount of power delivered to the device's receiver. By identifying and activating the charging coils closest to the device's receiver, the time to charge the device may be reduced, energy lost due to the distance between the charging coils and the receiver may be reduced, and energy consumption may be reduced.

The wireless charging system described herein may be capable of charging multiple devices, such as, for example, mobile phones, tablets, and laptops, simultaneously (e.g., substantially contemporaneously). The wireless charging system may include intelligence (e.g., via a software algorithm) to detect the devices placed on a charging mat regardless of each device's position and placement on the charging mat. For example, the devices may be placed on the charging mat of the wireless charging system at an angle and dispersed non-uniformly. The wireless charging system may use a software algorithm to determine where each device is located on the charging mat, where (approximately) the power receiver in the device is located, which charging coils of the multiple charging coils are closest to the power receiver of each device, and activate the closest charging coils while not activating (or deactivating) the remaining charging coils.

The wireless charging system may include multiple charging coils distributed within a charging mat. A controller (e.g., a controller circuit controlled by software) may be used to activate and deactivate particular charging coils in the charging mat to enable activating charging coils closest to each device's receiver and deactivating (or not activating) other charging coils that are farther in distance from each device's receiver. Once a device placed on the charging mat, the controller may gather information about the device, such as, for example a location of the device on the charging mat, a charge level of the device's battery, a discharge rate of the device's battery, a battery capacity associated with the device's battery, other information associated with the device, or any combination thereof. The controller may provide the gathered information the software algorithm to enable the algorithm to determine the charging requirements for the device.

Based on the device's location on the wireless charging system, the controller may identify a set of one or more charging coils that are near (e.g., within a predetermined distance from) the device. After the set of charging coils near the device is identified, the software may activate one or more charging coils from the set of charging coils, thereby causing the activated charging coils to transmit power to the device. For example, the software may activate the charging coils that have the most amount of surface area under (e.g., near) the device.

The charging mat may include a pressure sensitive layer or a reflective-light plate. The software may use the pressure sensitive layer or reflective-light plate to detect when a device has been placed on the charging mat of the wireless charging system and determine an approximate location of the device on the charging mat. Based on the location of the device, the software may identify the set of charging coils near the device and identify the one or more charging coils from the set that have the most surface area under the device.

If more than one charging coil is selected for activation, the software may control how much power each charging coil transmits. For example, if 90% of a first charging coil is under a device and 50% of a second charging coil is under the device, then the software may cause the first charging coil to transmit more power than the second charging coil. In this way, power may be more efficiently and effectively transmitted to the device. By selectively activating charging coils that have a large amount of surface area below the device, the number of charging coils that are activated may be reduced while increasing the time to charge the device and reducing transmission loss. In addition, the size of the mesh, the size of each charging coil in the mesh, and an amount that each charging coil overlaps adjacent charging coils may be varied. For example, using smaller charging coils or increasing the amount of overlap may be done to more efficiently use energy by activating those coils that are nearest (closest) to the device's power receiver. The one or more charging coils may be sufficiently near (close) to the receiver to create inductive coupling with the receiver to enable the device to be efficiently charged.

Thus, the wireless charging system may a mesh of multiple charging coils and a controller to provide efficient charging to devices irrespective of each device's position and alignment on the charging mat. The wireless charging system may use a pressure sensitive layer or other similar technology that can be used to detect the location and shape of a device that has been placed on the charging mat. The software algorithm may determine which of the charging coils are closest to each device that is on the charging mat and selectively activate particular charging coils, thereby reducing transmission loss (e.g., deactivating charging coils that are not near the device may reduce transmission loss). By not activating all the charging coils, the wireless charging system may use less energy as compared to a charging mat where all coils are activated. The software may use a controller circuit to determine the location and the position of each device on the charging mat and identify the position of the nearest charging coils. In a conventional charging mat, the location and orientation of each device may be specified, e.g., by indicating an outline of each device. In contrast, the wireless charging system described herein can charge devices that have been placed at an angle or at different locations across the charging mat. Thus, a user may place devices one the charging mat at any location and in any orientation (e.g., any angle). For example, physically challenged people or the elderly, who have difficulty placing a device within a constrained area on a charging mat are not constrained by the wireless charging system described herein and can place devices anywhere and at any angle on the charging mat. Multiple devices of different sizes may be placed on the mat to accommodate a large number of devices.

For example, a wireless charging hub (also known as a wireless charging system) may include (1) a pressure sensitive plate, (2) a plurality of charging coils, and (3) a base. The base may include one or more processors and logic instructions that are executable by the one or more processors to perform various operations. For example, the operations may include detecting that a device has been placed on the pressure sensitive plate and determining coordinates of a plurality of vertices of the device. The operations may include determining a location of the device on the pressure sensitive plate and an orientation (e.g., an angle of the longest side of the device to a particular edge of the pressure sensitive plate) of the device on the pressure sensitive plate. The orientation may be used to enable inductive coupling between the activated charging coil and the receiver. The operations may include determining an approximate position (e.g., a location and an orientation) of a receiver of the device and determining a charging coil of the plurality of charging coils that is sufficiently close to the receiver to efficiently charge the device. The operations may include activating the charging coil that is nearest to (e.g., sufficiently close to create inductive coupling with) the receiver of the device without activating a remainder of the plurality of charging coils. Determining the approximate location of the receiver of the device may include performing a search of a database based at least in part on the coordinates of the plurality of vertices of the device and determining the approximate location of the receiver of the device based on a result of the search. The operations may include determining, based at least in part on the coordinates of the plurality of vertices of the device, a presence of a second device on the pressure sensitive plate and determining a gap between the device and the second device. The operations may include determining an approximate location of a second receiver in the second device, determining a second charging coil that is nearest to (e.g., sufficiently close to create inductive coupling with) the second receiver, and activating the second charging coil. Identifying the charging coil that is nearest (e.g., sufficiently close to create inductive coupling with) to the receiver of the device may include determining a subset of charging coils from the plurality of charging coils, in which at least a portion of each charging coil of the subset of charging coils is located under the device. Each charging coil of the set of charging coils may be activated in turn (e.g., one by one) and a charge rate of the currently activated charging coil may be determined and stored. Based on the charge rate associated with each charging coil of the subset of charging coils, the charging coil with a highest charging rate may be activated. In some cases, the operations may include determining, based at least in part on the coordinates of the plurality of vertices of the device, that the device is either a large device or a small device. Activating a particular charging coil may cause the charging coil to wirelessly transmit power to the receiver of the device.

FIG. 1 is a block diagram illustrating an architecture 100 of a charging system 102 according to some implementations. The charging system 102 may include a base 104, multiple charging coils 106, and a pressure sensitive plate 108. While FIG. 1 illustrates the charging coils 106 as having a circular-shape, the charging coils 106 may include geometrically-shaped charging coils (e.g., circular, square, triangular, rectangular, hexagonal, or the like) and non-geometrically-shaped charging coils. The charging coils may also be referred to as transmitters because the charging coils wirelessly transmit power. As illustrated in FIG. 1, the charging coils 106 may be located inside (or on top of) the base 104 and the pressure sensitive plate 108 may be located on top of the charging coils 106.

The pressure sensitive plate 108 may use a type of technology that does not interfere with the wireless transmission of power. For example, because capacitive and light-based technologies may interfere with the wireless transmission of power, the pressure sensitive plate 108 may use a resistive plate that includes a glass panel (usually attached in front of a screen) that is covered with a conductive layer and with a resistive metallic layer. The two layers may be held apart by tiny spacers. A scratch-resistant layer may be placed on top of the layers to prevent damage. The resistive plate may run an electrical current through the two layers. Where portions of the device 126 touch the pressure sensitive plate 108, the two layers make contact at the locations where the film is being pressed. The pressure sensitive plate 108 detects the change in the electrical field and sends the coordinates of the points of contact to the base 104. After the coordinates of the touch points are known, the position module 112 may determine a position of the device 126. The pressure of the device 126 touching the top surface compresses the flexible top layer to the supported bottom layer, causing electrical contact of the two layers between the span of insulating spacers. The insulating spacers have known positions on the surface (e.g., defined by the manufacturer) and the position of the touch points is calculated based on (1) the known positions of the insulating spacers, (2) the resistance that is measured by the conductive material, and (3) calibration performed during an initialization of the wireless charging system 102.

The base 104 may include a device detector 110, a position module 112, and a charge control circuit 114. The logic of each of the device detector 110 and the position module 112 may be implemented in software, firmware, hardware, or any combination thereof. The charge control circuit 114 may include a database 116, a processor 118, and a transmitter controller 120. The transmitter controller may be capable of activating and deactivating individual ones of the charging coils 106, determining a charge rate associated with individual ones of the charging coils 106, and performing other functions related to the charging coils 106.

The device detector 110 may be electronically coupled to, and receive data 122 from, the pressure sensitive plate 108. For example, when a device 126 is placed on the pressure sensitive plate 108 (e.g., to initiate charging the device 126), the pressure sensitive plate 108 may provide the data 122 to the device detector 110. The device detector 110 may detect the presence of the device 126 based on the data 122 received from the pressure sensitive plate 108. The position module 112 may use the data 122 to determine a position of the device 126. For example, the position module 122 may determine an approximate location of vertices (e.g., corners) of the device 126, an approximate location of feet (e.g., small bumps on the back surface of a device 126) of the device 126, other position information associated with the device 126, or any combination thereof. Typically, phones, tablets, and computers are rectangular shaped and therefore have four vertices. However, the intelligence of the wireless charging hub 102 enables detection and charging of devices that do not have a rectangular shape. To determine a location of a vertex (or a foot) of a device 126, the position module 112 may determine, using the pressure sensitive plate 108, an X-axis coordinate and a Y-axis coordinate of the vertex (or the foot). In some cases, the data 122 may include a size of the device 126, a weight of the device 126, and the like.

The database 116 may be used to store information associated with devices that have been or may be placed on the wireless charging system 102. For example, after the position module 112 determines a location of the vertices (or feet) of the device 126 placed on the pressure sensitive plate 108, the position module 112 may determine an approximate shape of the device 126 and store the shape in the database 116. The position module 112 may determine a centroid of the device 126, determine an approximate location of a power receiver 128 in the device 126, detect multiple devices placed on the pressure sensitive plate 108, detect gaps between two or more devices placed on the pressure sensitive plate 108, store and/or retrieve information from the database 116, another position-related function described herein, or any combination thereof. In some cases, a manufacturer of the wireless charging system 102 may prepopulate the database 116 with information associated with popular devices. After the information associated with the device 126 is stored in the database 116, the information may be retrieved when the device 126 is detected on the pressure sensitive plate 108 at a later point in time. In some cases, the database 116 may be updated to include information about newer devices. The information in the database 116 may include an approximate location of one or more power receivers (e.g., the power receiver 128) in the device 126, a size of the battery in the device 126, a preferred charge rate of the battery in the device 126, and other device-specific information.

The processor 118 may execute logic 124 (e.g., software instructions, firmware instructions, hardware logic instructions, or any combination thereof) to perform various functions of the wireless charging system 102. For example, the logic 124 may be executed by the processor 118 to perform one or more processes (e.g., 400, 500, 600, 700, 800, or 900 described herein). The logic 124 may select which of the charging coils 106 to activate to charge a particular device and which of the remaining charging coils 106 to deactivate (or not activate). When a charging coil is activated, the charging coil may wirelessly transmit power. When a charging coil is not activated (e.g., inactive), the charging coil may not wireless transmit power. The receiver 128 of the device 126 may receive power from activated charging coils that are close to the receiver 128. The power received by the receiver 128 from the charging coils 106 may be used to power the device 126, charge a battery of the device 126, or both.

Thus, when the device 126 (e.g., mobile phone, tablet, laptop, or the like) is placed on the pressure sensitive plate 108, the device detector 110 may detect the presence of the device 126 and instruct the position module 112 to determine position information associated with the device 126. For example, the position module 112 may determine the coordinates of the portions of the device 126 where the device 126 is touching the pressure sensitive plate 108, such as, for example, the vertices of the device 126, the corners of the device 126*s*, the feet of the device 126, other position-related information, or any combination thereof. The position module 112 may determine a shape (e.g., rectangular, square, circular, or the like) of the device 126. The position module 112 may determine an approximate location of the power receiver 128 in the device 126 and provide the location to the charge control circuit 114. For example, the location of the power receiver 128 may be determined by (1) retrieving device-related information from the database 116, (2) determining a central point (e.g., centroid) of the device 126, or (3) by searching for and identifying the charging coils closest to the power receiver 128. To illustrate, for (3), the logic 124 may identify a subset of the charging coils 106 that are located underneath the device 126 and activate, for a predetermined period of time, each charging coil in the subset. During the predetermined period of time, the logic 124 may measure an ability of the activated charging coil to charge the device 126. After measuring the ability of each charging coil in the subset to charge the device 126, the logic 124 may determine an approximate location of the power receiver 128 and activate one or more charging coils from the subset that are nearest to (e.g., sufficiently close to create inductive coupling with) the power receiver 128 to charge a battery of the device 126. The logic 124 may thus activate one or more of the charging coils 106 that are located nearest the power receiver 128 in each device placed on the wireless charging system 102 and deactivate (or not activate) the remaining of the charging coils 106. In this way, the devices may be charged quickly while reducing energy consumption by not activating charging coils that are not closest to the power receiver of each device. The nearest charging coils may be sufficiently close to the receiver to create inductive coupling with the receiver to enable the device to be efficiently charged.

Figure 2:
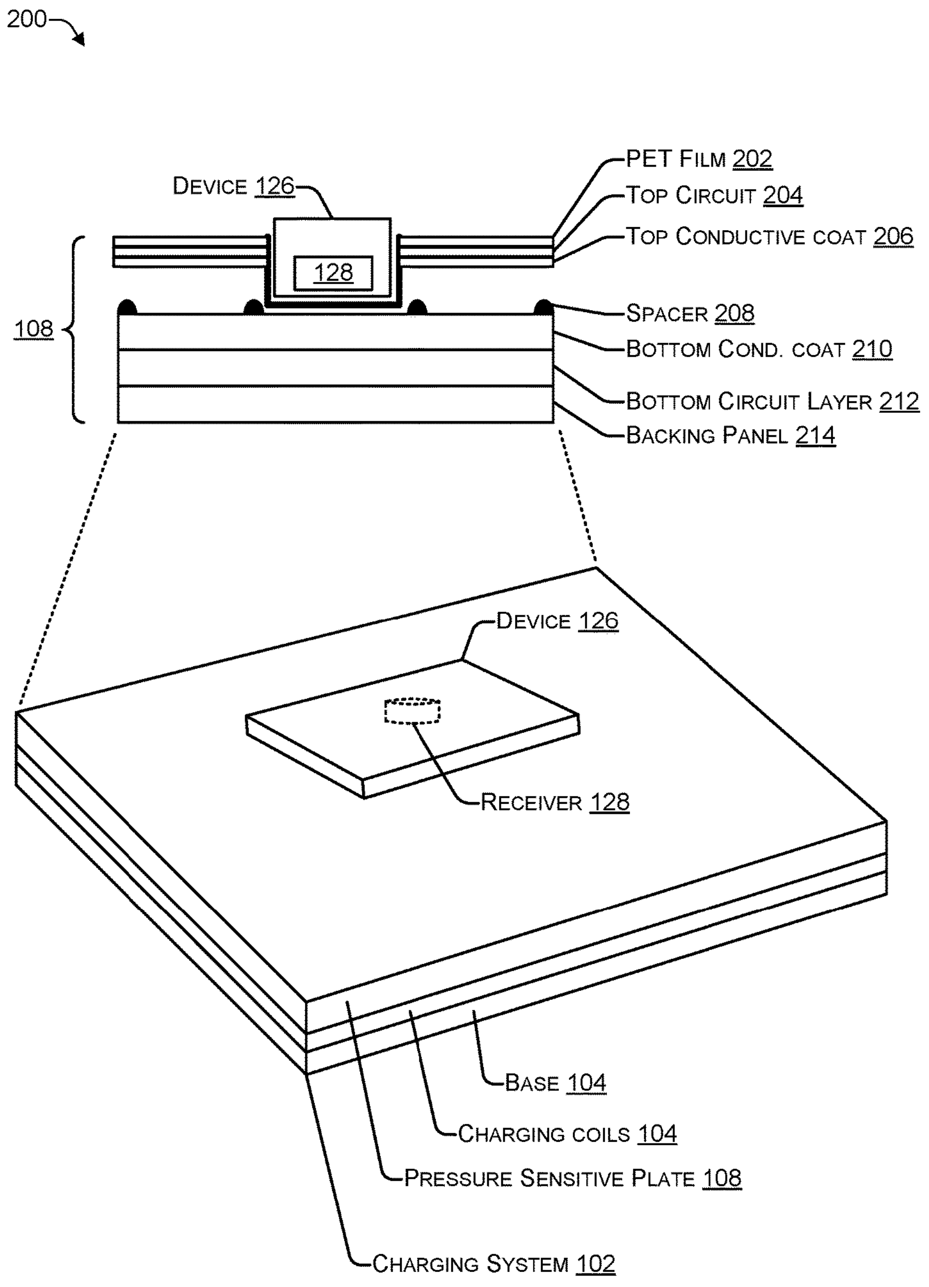
FIG. 2 is a block diagram illustrating an architecture that includes components of a charging system according to some implementations.

FIG. 2 is a block diagram illustrating an architecture that includes components of a charging system according to some implementations. The pressure sensitive plate 108 may include a top layer and a bottom layer that are separated by multiple spacers 208. The top layer may include a polyethylene terephthalate (PET) film 202 (e.g., to protect the top layer from damage), a top circuit 204, and a top conductive coating 206. The bottom layer may include a bottom conductive coating, a bottom circuit layer 212, and a backing panel 214.

The pressure sensitive plate 108 may use a type of technology that does not interfere with the wireless transmission of power, such as resistive plate technology. The top layer and the bottom layer may be held apart by the spacers 208. The PET film 202 may be scratch-resistant to prevent damage to the pressure sensitive plater 108. An electrical current may run through the top conductive coating 206 and the bottom conductive coating 210. When pressure is applied at a particular location of the pressure sensitive plate 108 (e.g., due to the weight of the device 126 being placed on the pressure sensitive plate 108), the two conductive coatings 206, 210 make contact at the location where the pressure is being applied. The pressure sensitive plate 108 detects the change in the electrical field and sends the x and y coordinates of the point of contact to the base 104. After the x and y coordinates of each touch point are known, the pressure sensitive plate 108 may determine a position of each location where pressure is being applied. The pressure of the device 126 touching the top surface compresses the flexible top layer to the supported bottom layer, causing electrical contact of the two layers between the span of insulating spacers 208. The insulating spacers 208 have known positions on the pressure sensitive plate 108 (e.g., defined by the manufacturer) and the position of the touch points (e.g., where pressure is being applied) may be calculated based on (1) the known positions of the insulating spacer 208*s*, (2) the resistance that is measured between the top conductive coating 206 and the bottom conductive coating, and (3) a calibration procedure of the pressure sensitive plate 108.

Figure 3:
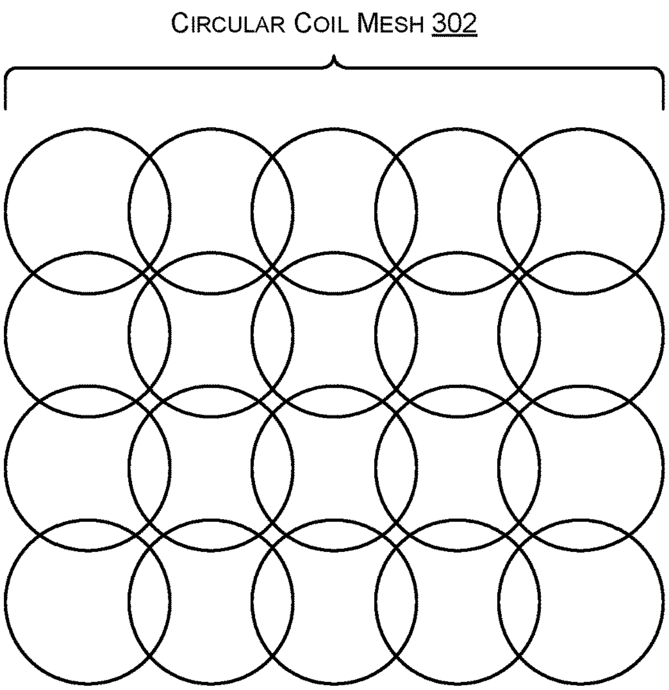
FIG. 3 illustrates exemplary charging coil configurations according to some implementations.
Figure 3:
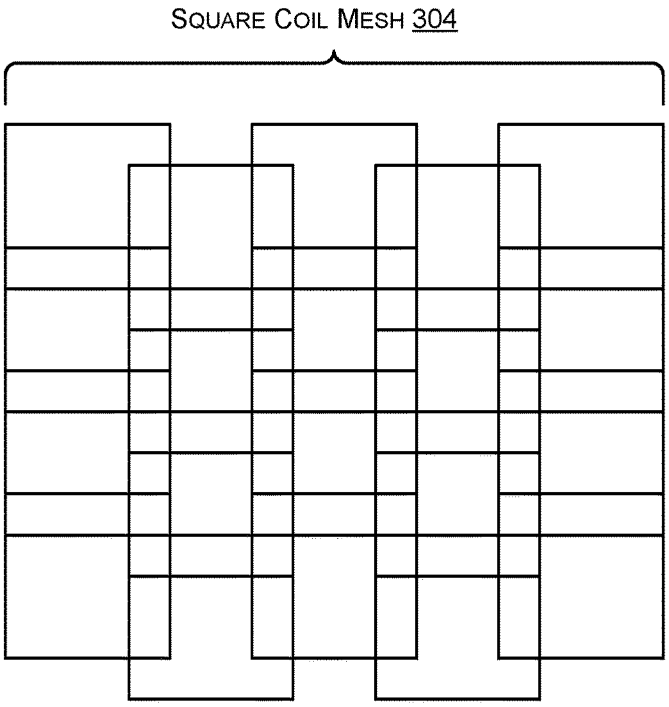

FIG. 3 illustrates exemplary charging coil configurations according to some implementations. The charging coils 106 of FIG. 1 may be arranged in different configurations. The charging coils 106 may include geometric shapes (e.g., circular, square, rectangular, hexagonal, or the like) and non-geometric shapes. Because the wireless charging system 102 selectively activates the charging coils 106, the charging coils 106 may be arranged in a mesh arrangement in which each charging coil overlaps a portion of adjacent charging coils. For example, a circular coil mesh 302 illustrates how circular shaped charging coils may be arranged to overlap in a mesh configuration. As another example, a square coil mesh 302 illustrates how square shaped charging coils may be arranged to overlap in a mesh configuration. Of course, other meshes, in which each charging coil overlaps with adjacent charging coils, may include geometrically shaped charging coils and/or non-geometrically shaped charging coils.

By using a mesh configuration, the intelligence (e.g., the logic 124) of the wireless charging system 102 may determine the position and shape of a device, determine an approximate location of a power receiver in the device (e.g., based on the position and shape of the device), identify the closest (e.g., nearest) charging coils to the power receiver, and activate the closest charging coils without activating (or by deactivating) the remaining charging coils.

In the flow diagrams of FIGS. 4, 5, 6, 7, 8, and 9, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. In addition, one or more blocks of a process may be combined with other blocks of another process. For discussion purposes, the processes 400, 500, 600, 700, 800, and 900 are described with reference to FIG. 1, FIG. 2, and FIG. 3 as described above, although other models, frameworks, systems and environments may implement these processes.

Figure 4:
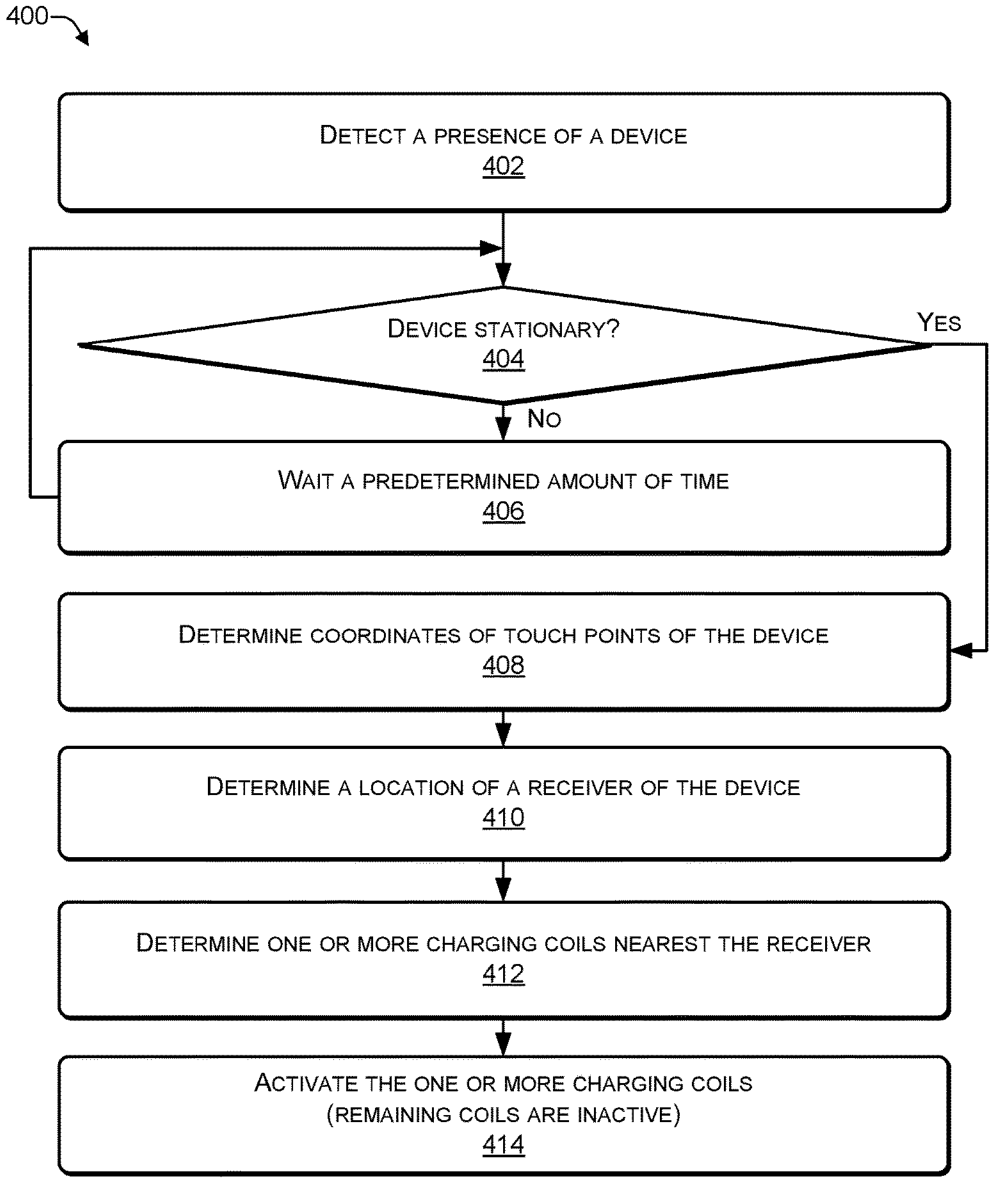
FIG. 4 is a flowchart of a process that includes determining whether a device stationary on a mat according to some implementations.

FIG. 4 is a flowchart of a process 400 that includes determining whether a device stationary on a mat according to some implementations. The process 400 may be performed by one or more of the components 110, 112, 114, 116, 118, 120, and 124 in FIG. 1.

At 402, a presence of a device (e.g., on a wireless charge system) may be detected. At 404, a determination may be made whether the device is stationary. If a determination is made, at 404, that the device is not stationary, the process may wait a predetermined amount of time (e.g., N milliseconds, where N>1), at 406, and then proceed to 404 to determine if the device is stationary. For example, in FIG. 1, the device detector 110 may receive the data 122 from the pressure sensitive plate 108 and determine, based on the data 122, that the device 126 has been placed on the pressure sensitive plate 108.

If a determination is made, at 404, that the device stationary, coordinates of touch points of the device may be determined, at 408. At 410, an approximate location of a receiver of the device may be determined. For example, in FIG. 1, the position module 112 may determine the approximate location of the receiver 128 in the device 126 by determining coordinates of each vertex (or foot) associated with the device 126. The position module 112 may search the database 116 to determine if information associated with the device, such as the location of the receiver 128, has been stored in the database 116. If the position module 112 finds information associated with the device 126 stored in the database 116, then the position module 112 may use the information in the database to determine an approximate location of the receiver 128.

If the position module 112 does not find information associated with the device 126 in the database 116, then the position module 112 may determine an approximate location of the receiver 128. If the device 126 is small (e.g., less than or equal to a predetermined size), then the position module 112 may determine a centroid of the device 126 and use the centroid as the approximate location of the receiver 128. The position module 112 may store information about the device 126, including a length of each edge of the device 126, the centroid of the device 126 (e.g., approximate location of the receiver 128), and other position and size related information in the database 116.

If the device 126 is large (e.g., great than the predetermined size), then the position module 112 may request the logic 124 to determine the approximate location of the receiver 128. For example, the logic 124 may receive position-related information (e.g., the coordinates associated with vertices or feet) associated with the device 126 from the position module 112. The logic 124 may identify a set of one or more of the charging coils 106 that are located approximately under the device 126. The logic 124 may instruct the charge control circuit 114 to activate, one by one (e.g., in turn), each charging coil in the set of charging coils that are underneath the device 126 for a predetermined amount of time (e.g., M milliseconds, where M>0). After each of the charging coils in the set of charging coils has been activated in turn, the logic 124 may determine an approximate location of the receiver 128 based on the amount of power the receiver 128 received from each charging coil. The logic 124 may store information about the device 126, including a length of each edge of the device 126, the approximate location of the receiver 128, and other position and size related information in the database 116.

The position module 112 may detect edges of the device 126. The position module 112 may determine the placement of the device 126 on the pressure sensitive plate 108. The pressure sensitive plate 108 may determine the coordinates of the touch points associated with the device 126. Assuming that the receiver 128 is located approximately at a central point of the device 126, the centroid of the device 126 may be determined. The location (Cx, Cy) of a centroid of a non-self-intersecting closed polygon is defined by N vertices (X0,Y0), (X1,Y1), . . . , (Xn−1,yN−1), where:

$$C_x = \frac{1}{6A}\sum_{i=0}^{n-1}(x_i + x_{i+1})(x_i y_{i+1} - x_{i+1} y_i)$$

$$C_y = \frac{1}{6A}\sum_{i=0}^{n-1}(y_i + y_{i+1})(x_i y_{i+1} - x_{i+1} y_i)$$

where A is the polygon's signed area:

$$A = \frac{1}{2}\sum_{i=0}^{n-1}(x_i y_{i+1} - x_{i+1} y_i)$$

The edges of the device 126 may be determined as follows. First, the vertices of the device 126 may be determined. For example, when the device 126 is approximately rectangular in shape, the device 126 may have four vertices with x and y coordinates (X1, Y1), (X2, Y2), (X3, Y3), and (X4, Y4). Of course, additional or fewer vertices may be determined for other shapes. After determining the touch points of the device 126 on the pressure sensitive plate 108, the vertices may be determined. For example, determining a point (Xn, Yn) where pressure is detected and determining (Xn−m, Yn) where no pressure is detected, determines a first vertex at one end of the X-axis. Determining a point (Xn, Yn) where pressure is detected and determining (Xn+m, Yn) where no pressure is detected, determines a second vertex at the other end of the X-axis. Determining a point (Xn, Yn) where pressure is detected and determining (X, Yn−m) where no pressure is detected, determines a third vertex at one end of the Y-axis. Determining a point (Xn, Yn) where pressure is detected and determining (X, Yn+m) where no pressure is detected, determines a fourth vertex at the other end of the Y-axis.

At 412, one or more charging coils near (e.g., closest to) the receiver of the device may be determined. At 414, the one or more charging coils near the receiver of the device may be activated, while the remaining charging coils of the charging mesh may be inactive. For example, in FIG. 1, the logic 124 may instruct the transmitter controller 120 to activate one or more of the charging coils 106 that are near (e.g., at least a portion of each charging coil is underneath) the device 126. The remainder of the charging coils 106 may be inactive. The one or more charging coils may be sufficiently near to the receiver to create inductive coupling with the receiver to enable the device to be efficiently charged.

The charge control circuit 114 may determine which of the one (or more) of the charging coils 106 to activate. The database 116 may include the (x,y) coordinates of each of the charging coils 106. After the device 126 is placed on the wireless charging system 102 and the center point (Cx, Cy) of the device is determined, the charge control circuit 114 may determine one or more of the charging coils 106 that are closest to the center point (Cx, Cy). For example, the charge control circuit 114 may determine a distance between a center of each of the charging coils 106 and the center point of the device and then select a particular charging coil with a shortest distance between the center the particular charging coil and the center point of the device. To illustrate, the charge control circuit 114 may determine Min(Difference (Coordinates(Charging Point), Coordinates(Center of Device)). In some cases, the charge control circuit 114 may select a set of charging coils that have a distance between the center of each charging coil in the set of charging coils and the center point of the device that is less than a predetermined amount. For example, in FIG. 1, if the device 126 is placed at a location where the center of the device 126 is approximately equidistant from the center of four charging coils, then the four charging coils may be selected. The charge control circuit 114 may activate the selected charging coils and deactivate (or not activate) a remainder of the charging coils. In some cases, if the device 126 is placed at a location where the center of the device 126 is approximately equidistant from the center of more than one charging coil, then the charge control circuit 114 may activate each of the equidistant charging coil points for a predetermined time period, determine the charge rate (e.g., charge capacity increase over time P) for each of the equidistant charging coil points, and activate the charging coil with the highest charge rate. In contrast to conventional charging mats where the user is required to orient a device to achieve a fast charge rate, the wireless charging system 102 enables the user to drop a device on the pressure sensitive plate 108 and the wireless charging system 102 determines which of the charging coils 106 to activate to quickly charge the device 126.

When the device 126 has feet (e.g., protrusions on the back of the device 126), then the coordinates of the feet may be determined based on the pressure that the feet exert on the pressure sensitive plate 108 and used to determine an approximate center of the device 126.

Figure 5:
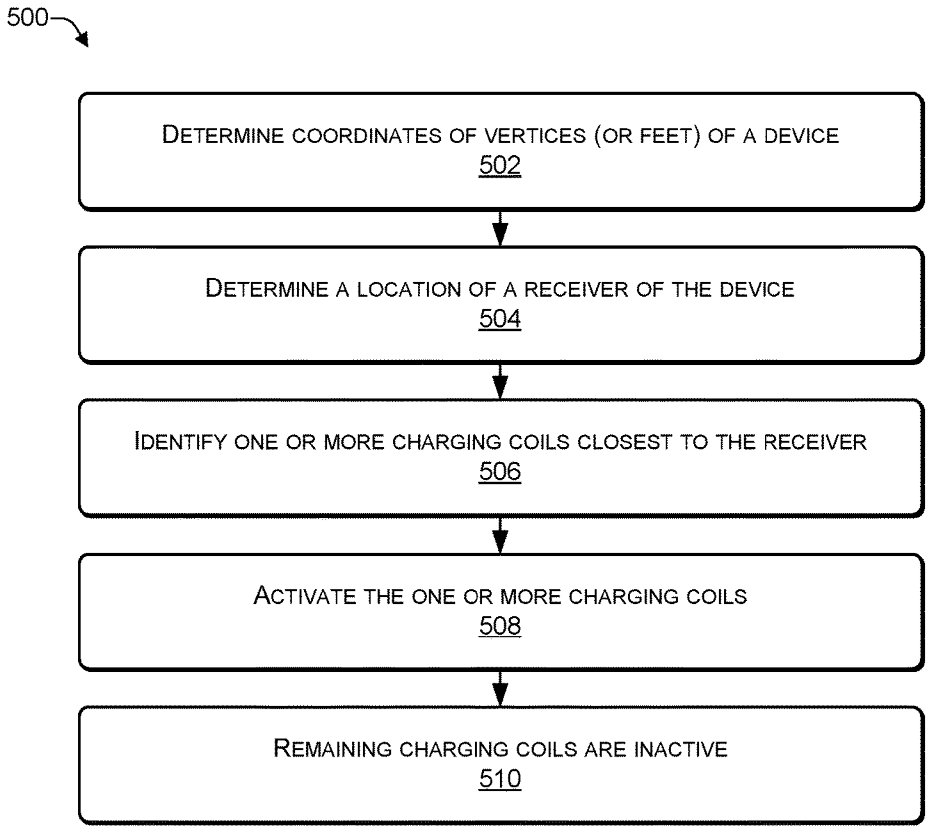
FIG. 5 is a flowchart of a process that includes determining a centroid of a device according to some implementations.

FIG. 5 is a flowchart of a process 500 that includes determining a centroid of a device according to some implementations. The process 500 may be performed by one or more of the components 110, 112, 114, 116, 118, 120, and 124 in FIG. 1.

At 502, coordinates of vertices (or feet) of a device may be determined. At 504, a location of a receiver of the device may be determined. For example, in FIG. 1, the position module 112 may determine the approximate location of the receiver 128 in the device 126 by determining coordinates of each vertex (or foot) associated with the device 126. The position module 112 may search the database 116 to determine if information associated with the device, such as the location of the receiver 128, has been stored in the database 116. If the position module 112 finds information associated with the device 126 stored in the database 116, then the position module 112 may use the information in the database to determine an approximate location of the receiver 128.

If the position module 112 does not find information associated with the device 126 in the database 116, then the position module 112 may determine an approximate location of the receiver 128. If the device 126 is small (e.g., less than or equal to a predetermined size), then the position module 112 may determine a centroid of the device 126 and use the centroid as the approximate location of the receiver 128. The position module 112 may store information about the device 126, including a length of each edge of the device 126, the centroid of the device 126 (e.g., approximate location of the receiver 128), and other position and size related information in the database 116.

If the device 126 is large (e.g., great than the predetermined size), then the position module 112 may request the logic 124 to determine the approximate location of the receiver 128. For example, the logic 124 may receive position-related information (e.g., the coordinates associated with vertices or feet) associated with the device 126 from the position module 112. The logic 124 may identify a set of one or more of the charging coils 106 that are located approximately under the device 126. The logic 124 may instruct the charge control circuit 114 to activate, one by one (e.g., in turn), each charging coil in the set of charging coils that are underneath the device 126 for a predetermined amount of time (e.g., M milliseconds, where M>0). After each of the charging coils in the set of charging coils has been activated in turn, the logic 124 may determine an approximate location of the receiver 128 based on the amount of power the receiver 128 received from each charging coil. The logic 124 may store information about the device 126, including a length of each edge of the device 126, the approximate location of the receiver 128, and other position and size related information in the database 116.

The position module 112 may detect edges of the device 126. The position module 112 may determine the placement of the device 126 on the pressure sensitive plate 108. The pressure sensitive plate 108 may determine the coordinates of the touch points associated with the device 126. Assuming that the receiver 128 is located approximately at a central point of the device 126, the centroid of the device 126 may be determined, as discussed above.

At 506, one or more charging coils closest to the device receiver may be identified. At 508, the identified charging coils may be activated. At 510, a remained of the charging coils may be inactive (or deactivated). For example, in FIG. 1, the logic 124 may instruct the transmitter controller 120 to activate one or more of the charging coils 106 that are near (e.g., at least a portion of each charging coil is underneath) the device 126. The remainder of the charging coils 106 may be inactive.

The charge control circuit 114 may determine which of the one (or more) of the charging coils 106 to activate. The database 116 may include the (x,y) coordinates of each of the charging coils 106. For example, after the device 126 is placed on the wireless charging system 102 and the center (Cx, Cy) of the device is determined, the charge control circuit 114 may determine one or more of the charging coils 106 that are closest to the center. For example, the charge control circuit 114 may determine a distance between a center of each of the charging coils 106 and the center point of the device and then select a particular charging coil with a shortest distance between the center the particular charging coil and the center point of the device. In some cases, the charge control circuit 114 may select a set of charging coils that have a distance between the center of each charging coil in the set of charging coils and the center point of the device that is less than a predetermined amount. For example, in FIG. 1, if the device 126 is placed at a location where the center of the device 126 is approximately equidistant from the center of four charging coils, then the four charging coils may be selected. The charge control circuit 114 may activate one or more of the selected charging coils and deactivate (or not activate) a remainder of the charging coils.

Figure 6:
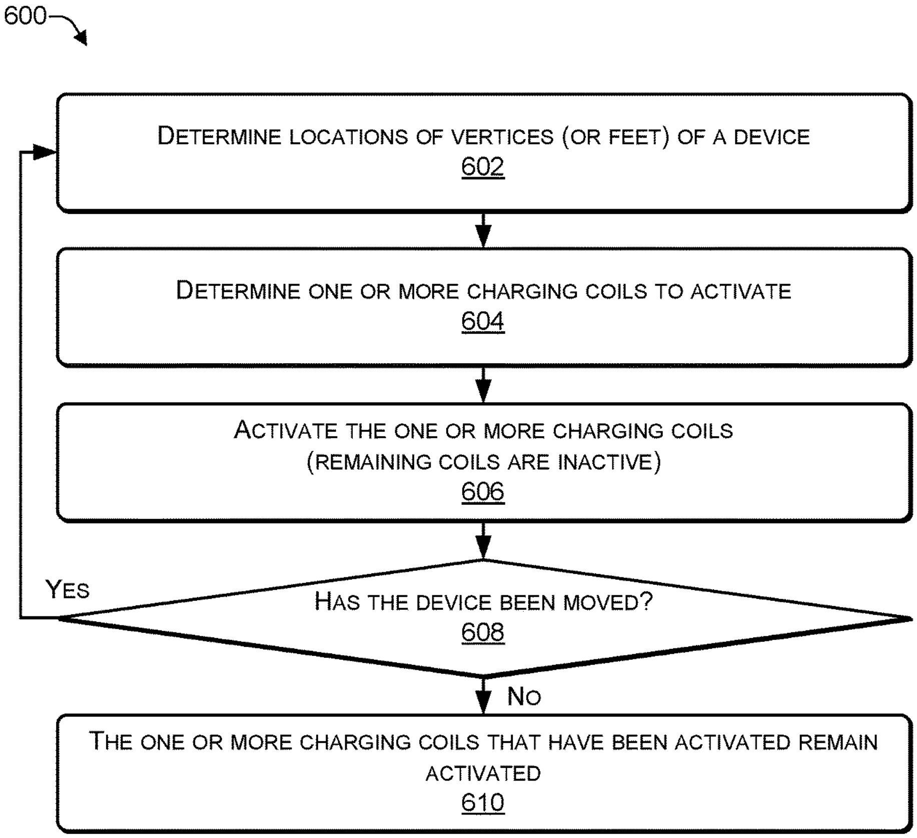
FIG. 6 is a flowchart of a process that includes determining locations of vertices or feet of a device according to some implementations.

FIG. 6 is a flowchart of a process 600 that includes determining locations of vertices or feet of a device according to some implementations. The process 600 may be performed by one or more of the components 110, 112, 114, 116, 118, 120, and 124 in FIG. 1. The process 600 illustrates what may occur when a user places a device on the wireless charging system and then, at a later point in time, moves the device. For example, the user may move the device to enable the user to place a second device on the wireless charging system.

At 602, locations of vertices (or feet) of a device may be determined. At 604, one or more charging coils to activate may be determined. At 606, the one or more charging coils may be activated. For example, in FIG. 1, the position module 112 may determine coordinates of each vertex (or foot) associated with the device 126 and determine the approximate location of the receiver 128 in the device 126 based on the coordinates of each vertex (or foot). The logic 124 may instruct the transmitter controller 120 to activate one or more of the charging coils 106 that are closest to the device 126. The remainder of the charging coils 106 may be inactive.

At 608, a determination may be made whether the device has been moved. In response to determining, at 608, that the device has been moved, the process may proceed to 602 to re-determine the locations of the vertices (or feet) of the device. In response to determining, at 608, that the device has not been moved, the one or more charging coils that were activated (e.g., at 606) may remain activated.

Figure 7:
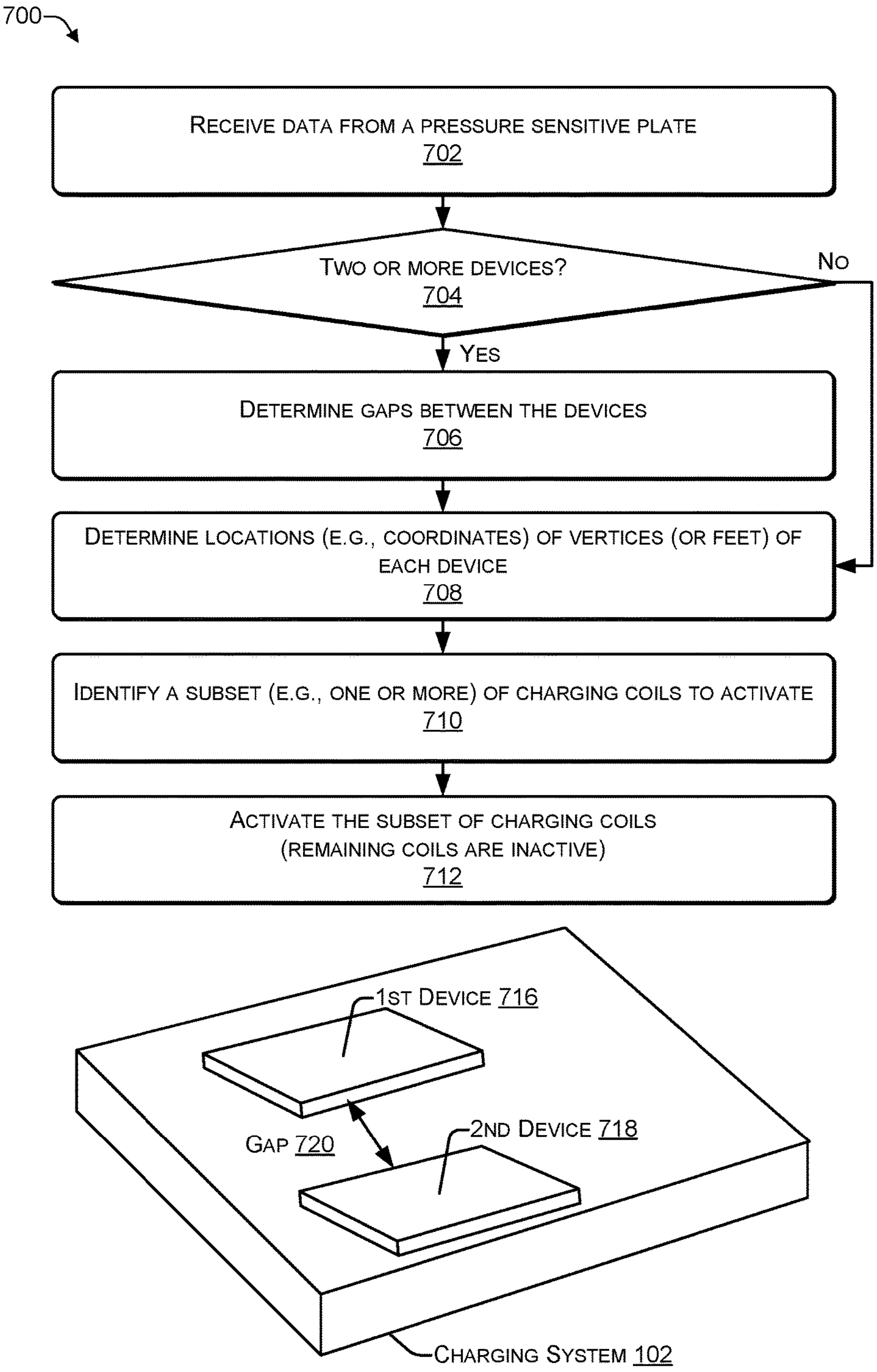
FIG. 7 is a flowchart of a process that includes determining whether more than one device has been placed on a charging system according to some implementations.

FIG. 7 is a flowchart of a process 700 that includes determining whether more than one device has been placed on a charging system according to some implementations. The process 700 may be performed by one or more of the components 110, 112, 114, 116, 118, 120, and 124 in FIG. 1. The process 700 may be used to determine which charging coils to activate when more than one device is placed on the wireless charging system 102. If the devices are placed one after another (e.g., a first device 716 is placed first, a second device 718 is placed X seconds later (X>0), and so on) then the wireless charging system 102 detects each device as it is placed on the pressure sensitive plate 108, as described above. The process 700 describes what happens when two devices (e.g., the first device 716 and the second device 718) are placed on the wireless charging system 102 substantially simultaneously. Of course, those versed in the art will understand that the process 700 can easily be modified to accommodate more than two devices that are placed substantially simultaneously on the wireless charging system 102.

At 702, data may be received from a pressure sensitive plate. At 704, a determination may be made (based on the data) whether there are two or more devices. For example, in FIG. 1, the pressure sensitive plate 108 may provide the data 122 to the device detector 110. The device detector 110 may determine that there are two (or more) devices with two (or more) sets of vertex coordinates.

In response to determining, at 704, that there are two (or more) devices, the process may proceed to 706, where one (or more gaps) between the devices may be determined. In response to determining, at 704, that there is one device, the process may proceed to 708. For example, the device detector 110 may measure a gap 720 between the devices 716, 718. If the gap 720 is greater than a predetermined threshold, the device detector 110 may treat the set of coordinates received (e.g., in the data 122) from the pressure sensitive plate 108 as two (or more) separate devices. If the gap 720 is less than or equal to the predetermined threshold, the device detector 110 may treat the set of coordinates received (e.g., in the data 122) from the pressure sensitive plate 108 as a single large device. The process of charging a large device is described in more detail in FIG. 8. The device detector 110 may determine a set of the charging coils 106 that are underneath the two devices 716, 718 that have been placed close together, activate each charging coil of the set of charging coils in turn (e.g., one by one) and determine a charge rate for each charging coil. The device detector 110 may activate those charging coils that have a high charge rate (e.g., a charge rate greater than a predetermined rate, Y charging coils with the highest charge rates where Y>1, or the like).

At 708, locations of vertices (or feet) of each device may be determined. At 710, a subset (e.g., one or more) charging coils may identified for activation. At 712, the subset of charging coils may be activated while a remainder of the charging coils may be inactive. For example, if the gap is greater than the predetermined threshold, then the device detector 110 may determine a set of vertices for each of the devices placed on the wireless charging system 102, e.g., a first set of vertices for the first device 716 and a second set of vertices for the second device. If the gap is less than or equal to the predetermined threshold (e.g., the devices 716, 718 are placed in close proximity to each other), then the device detector 110 may determine a set of vertices for the large shape created by the two devices.

The charge control circuit 114 may determine which of the one (or more) of the charging coils 106 to activate. The database 116 may include the (x,y) coordinates of each of the charging coils 106. For example, the charge control circuit 114 may determine a distance between a center of each of the charging coils 106 and the center point of the devices 716, 718 and then select a particular charging coil with a shortest distance between the center the particular charging coil and the center point of the device. In some cases, the charge control circuit 114 may select a set of charging coils that have a distance between the center of each charging coil in the set of charging coils and the center point of the devices 716, 718 that is less than a predetermined amount. For example, if the device 716 is placed at a location where the center of the device 126 is approximately equidistant from the center of four charging coils, then the four charging coils may be selected. The charge control circuit 114 may activate the selected charging coils and deactivate (or not activate) a remainder of the charging coils. In some cases, if the device 716 is placed at a location where the center of the device 716 is approximately equidistant from the center of more than one charging coil, then the charge control circuit 114 may activate each of the equidistant charging coil points for a predetermined time period, determine the charge rate (e.g., charge capacity increase over time P) for each of the equidistant charging coil points, and activate the charging coil with the highest charge rate. In contrast to conventional charging mats where the user is required to orient a device to achieve a fast charge rate, the wireless charging system 102 enables the user to drop a device on the pressure sensitive plate 108 and the wireless charging system 102 determines which of the charging coils 106 to activate to quickly charge the device 126.

Figure 8:
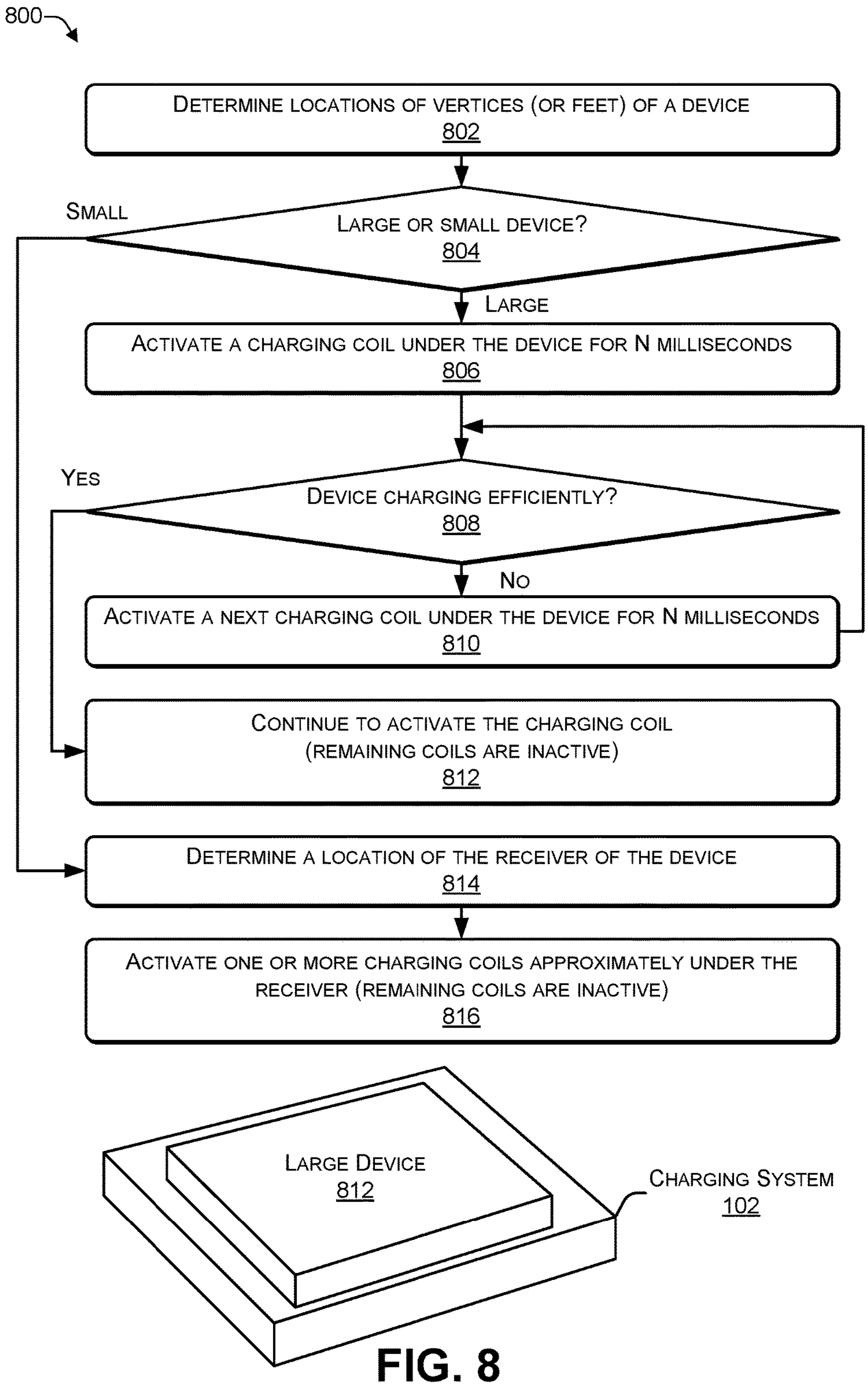
FIG. 8 is a flowchart of a process that includes activating charging coils one by one for a predetermined period of time under a large device according to some implementations.

FIG. 8 is a flowchart of a process 800 that includes activating charging coils one by one for a predetermined period of time under a large device according to some implementations. The process 800 may be performed by one or more of the components 110, 112, 114, 116, 118, 120, and 124 in FIG. 1. The process 700 may be used to determine which charging coils to activate when a large device is placed on the wireless charging system 102. The process 800 may be performed when a large device is detected on the wireless charging system 102.

At 802, a location (e.g., coordinates) of each vertex of a device may be determined. At 804, a determination may be made (e.g., based on the coordinates of the vertices) whether the device is a large device or small device. If a determination is made, at 804, that the device is a small device, then the process may proceed to 814. If a determination is made, at 804, that the device is a large device 812, then the process may proceed to 806. Different techniques may be used to classify a device as either a large device or a small device. For example, the longest edge (e.g., length) of the device may be determined and if the longest edge is greater than a predetermined threshold, then the device may be determined to be a large device. As another example, the longer edge (length) and the shorter edge (width) may be multiplied to determine an area occupied by the device. If the area occupied by the device is greater than a predetermined threshold, then the device may be determined to be a large device. Of course, additional thresholds may be used to classify the size of a device as large, medium, or small.

At 806, a charging coil under the large device may be activated for N milliseconds (N>0). For example, a set of charging coils that are at least partially under the large device may be determined. A center (e.g., centroid) of the large device may be determined. A charging coil in the set of charging coils that is closest to the center may be activated.

At 808, a determination may be made whether the activated charging coil is efficiently charging the large device. If a determination is made, at 808, that the charging coil is efficiently charging the large device, then the process may proceed to 812, where the charging coil that was determined to efficiently charge the large device remains active while the remaining charging coils are inactive (or deactivated). If a determination is made, at 808, that the charging coil is inefficient at charging the large device, then the process may proceed to 810, where a next charging coil may be activated (and the charging coil that was activated is deactivated) under the device for N milliseconds, and a determination may be made, at 808, whether the next charging col is efficiently charging the large device. For example, after activating the charging coil nearest the center, a charge rate of a battery of the large device may be determined. If the charge rate satisfies a predetermined threshold, then the charge rate may be considered to be an efficient charging rate. If the charge rate does not satisfy the predetermined threshold, then the charging coil may be inefficient at charging the large device, and a next charging coil under the device may be activated (and the previously activated charging coil may be deactivated). Thus, 808, 810 may be repeated, individually activating charging coils one by one, until a charging coil that is located underneath the large device is determined to be capable of efficiently charging the large device. In some cases, each of the charging coils in the set of charging coils that are at least partially underneath the device may be activated in turn (e.g., one by one). The charge rate and a location of the associated charging coil in the set of charging coils may be stored in a table. After each of the charging coils in the set of charging coils have been activated in turn, based on the table, the charging coil with the highest charge rate may be activated and the remaining charging coils deactivated.

At 814 (e.g., if the device is determined to be a small device), then a location of the receiver of the device is determined, at 814, and one or more charging coils near the receiver are activated while the remaining charging coils are inactive. For example, in FIG. 1, if the coordinates of the device 126 match a set of coordinates in the database 116, then the location of the receiver 128 may be retrieved from the database 116. If the coordinates of the device 126 do not match a set of coordinates in the database 116, then a center point (e.g., centroid) of the device 126 may be determined, as previously discussed, and the center point may be used as the approximate location of the receiver 128.

Figure 9:
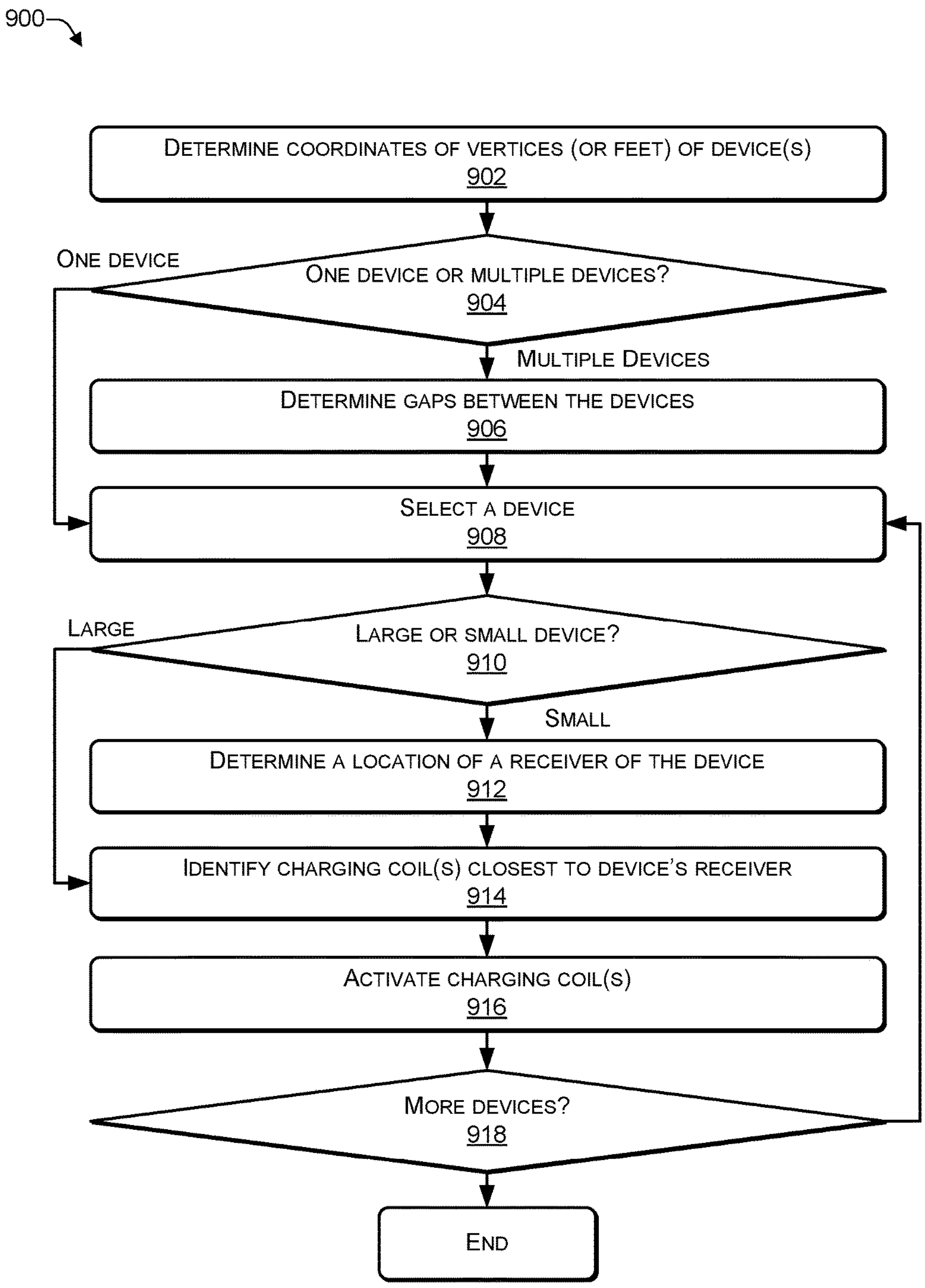
FIG. 9 is a flowchart of a process that includes determining whether a device is a small device or a large device according to some implementations.

FIG. 9 is a flowchart of a process 900 that includes determining whether a device is a small device or a large device according to some implementations. The process 900 may be performed by one or more of the components 110, 112, 114, 116, 118, 120, and 124 in FIG. 1. The process 900 combines portions of previously described processes 400, 500, 600, 700, and 800.

At 902, coordinates of vertices (or feet) of each device may be determined. At 904, a determination may be made (based on the coordinates) whether there is one device or more than one device. In response to determining, at 904, that there is one device, the process proceeds to 908. In response to determining, at 904, that there is more than one device, the process proceeds to 906, where gaps between the multiple devices are detected. For example, in FIG. 1, the pressure sensitive plate 108 may provide the data 122 to the device detector 110. The device detector 110 may determine, based on the data 122, whether there is one device or more than one device (e.g., based on the vertex coordinates). The device detector 110 may determine a gap between each of the devices. If the gap is greater than a predetermined threshold, the device detector 110 may treat the set of coordinates received (e.g., in the data 122) from the pressure sensitive plate 108 as two (or more) separate devices. In some cases, if the gap is less than or equal to the predetermined threshold, the device detector 110 may treat the set of coordinates received (e.g., in the data 122) from the pressure sensitive plate 108 as a single large device.

At 908, a device may be selected. If a single device is detected, then the single device is selected. If multiple devices are detected, then one device of the multiple devices is selected. At 910, a determination may be made whether the selected device is a large device or a small device. In response to determining that the device is a large device, the process proceeds to 914. In response to determining that the device is a small device, the process proceeds to 912. Different techniques may be used to classify a device as either a large device or a small device. For example, the longest edge (e.g., length) of the device may be determined and if the longest edge is greater than a predetermined threshold, then the device may be determined to be a large device. As another example, the longer edge (length) and the shorter edge (width) may be multiplied to determine an area occupied by the device. If the area occupied by the device is greater than a predetermined threshold, then the device may be determined to be a large device. Of course, additional thresholds may be used to create classifications with more than two sizes, such as a three size (large, medium, or small) classification.

At 912, a location of a receiver of the device may be determined. At 914, one or more charging coils closest to the receiver may be identified. At 916, the charging coils may be activated. For example, a center (e.g., centroid) of the device may calculated. If the device is a small device, then the center of the device may be used as an approximate location of the device and a charging coil closest to the center of the device may be activated. If the device is a large device, then a charging coil with a highest charge rate may be identified, as follows. A set of charging coils that are at least partially under the large device may be determined. A center (e.g., centroid) of the large device may be determined. Starting with the charging coil in the set of charging coils that is closest to the center of the device, each coil in the set of charging coils may be activated in turn (e.g., one by one) for a predetermined amount of time. Each time a charging coil is activated, a charge rate of a battery of the large device may be determined. The charge rate and a location of the associated charging coil in the set of charging coils may be stored in a table. After each of the charging coils in the set of charging coils have been activated in turn, the table may be used to identify the charging coil with the highest charge rate and the charging coil that is identified may be activated and the remaining charging coils deactivated.

At 918, a determination may be made whether there are more devices (e.g., of the multiple devices). If a determination is made, at 918, that there are more devices (of the multiple devices), then the process proceeds to 908 where a next device is selected. If a determination is made, at 918, that there are no more devices (e.g., each device of the multiple devices was selected or there was a single device), then the process ends.

Figure 10:
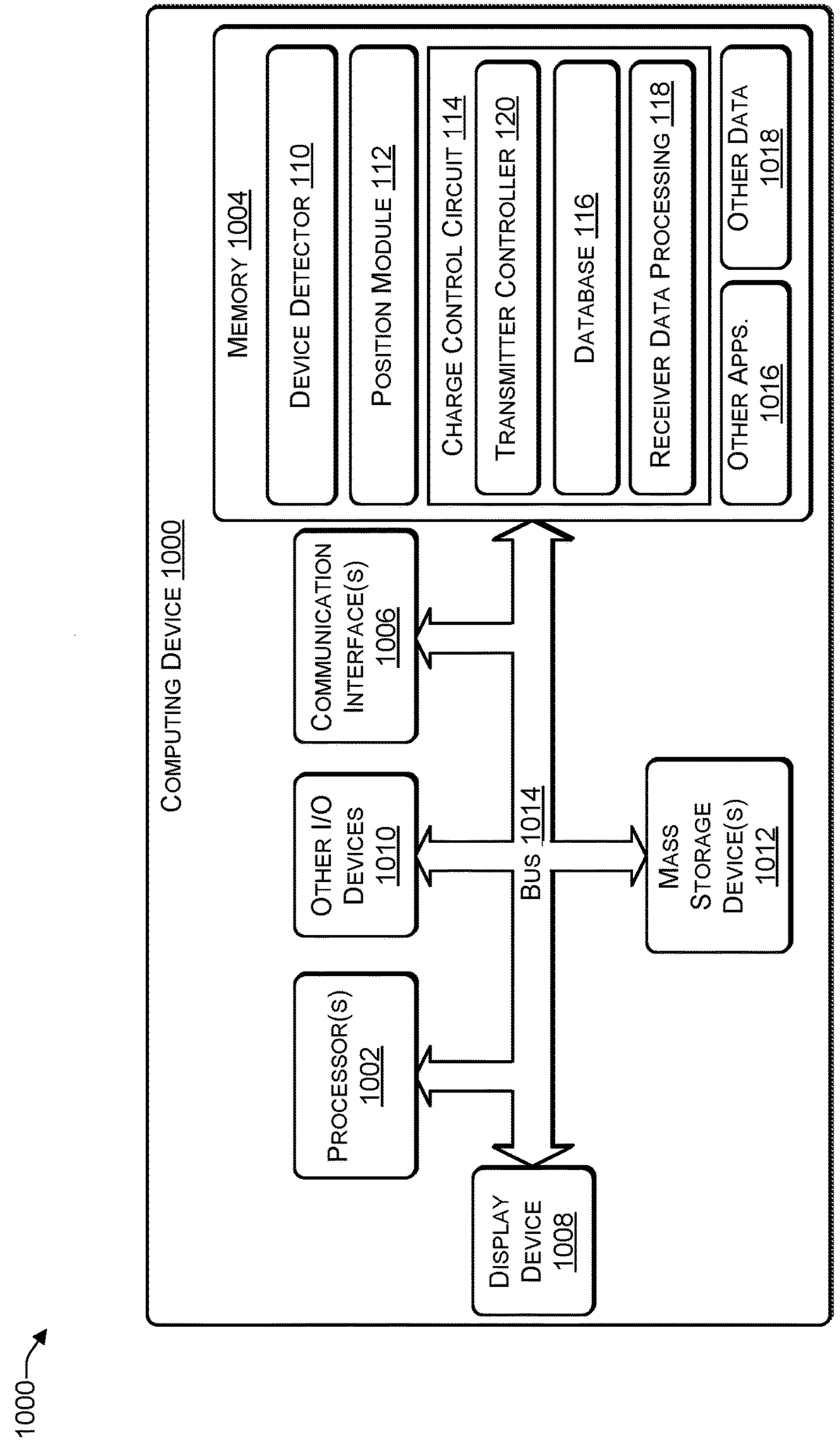
FIG. 10 illustrates an example configuration of a computing device that can be used to implement the systems and techniques described herein.

FIG. 10 illustrates an example configuration of a computing device 1000 that can be used to implement the systems and techniques described herein, such as, for example, the wireless charging system 102 of FIG. 1. The computing device 1000 may include one or more processors 1002, the memory 1004, communication interfaces 1006, a display device 1008, other input/output (I/O) devices 1010 (e.g., keyboard, trackball, and the like), and one or more mass storage devices 1012, configured to communicate with each other, such as via one or more system buses 1014 or other suitable connections. While a single system bus is illustrated for ease of understanding, it should be understood that the system buses 1014 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 1002 are hardware devices (e.g., integrated circuits) that may include a single processing unit or a number of processing units, all of which may include single or multiple computing units or multiple cores. The processors 1002 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 1002 may be configured to fetch and execute computer-readable instructions stored in the memory 1004, mass storage devices 1012, or other computer-readable media.

Memory 1004 and mass storage devices 1012 are examples of computer storage media (e.g., memory storage devices) for storing instructions that can be executed by the processors 1002 to perform the various functions described herein. For example, memory 1004 may include both volatile memory and non-volatile memory (e.g., RAM, ROM, or the like) devices. Further, mass storage devices 1012 may include hard disk drives, solid-state drives, removable media, including external and removable drives, memory cards, flash memory, floppy disks, optical disks (e.g., CD, DVD), a storage array, a network attached storage, a storage area network, or the like. Both memory 1004 and mass storage devices 1012 may be collectively referred to as memory or computer storage media herein, and may be any type of non-transitory storage media capable of storing computer-readable, processor-executable program instructions as computer program code that can be executed by the processors 1002 as a particular machine configured for carrying out the operations and functions described in the implementations herein.

The computing device 1000 may also include one or more communication interfaces 1006 for exchanging data via a network. The communication interfaces 1006 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 1006 can also provide communication with external storage, such as a storage array, network attached storage, storage area network, cloud storage, or the like.

Other I/O devices 1010 may be devices that receive various inputs from a user and provide various outputs to the user, and may include a keyboard, a touchpad, a mouse, a printer, audio input/output devices, and so forth. The other I/O devices 1010 may include various types of sensors, at least some of which may be used to determine a distance (e.g., proximity) between the devices 102 and the target device 108 of FIG. 1. For example, the other I/O devices may include one or more of a magnetometer, a global satellite positioning (GPS) sensors, inertial sensors inertial sensors (e.g., a compass or magnetometer to determine direction, an accelerometer to report how fast the computing device is moving in the direction, and a gyroscope to sense turning motions), a barometer, radio-frequency identification (RFID), near-field communication (NFC), or the like.

The computer storage media, such as memory 1004 and mass storage devices 1012, may be used to store software and data. For example, the computer storage media may be used to store the device detector module 110, the position module 112, the charge control circuit 114, other applications 1016, and other data 1018.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

detecting, by one or more processors of a wireless charging hub, a presence of a device that has been placed on a pressure sensitive plate of the wireless charging hub;

determining, by the one or more processors, coordinates of a plurality of vertices of the device;

determining, by the one or more processors, an approximate location of a receiver of the device, wherein the approximate location includes a locus and an orientation;

identifying, by the one or more processors, a charging coil that is nearest to the receiver of the device, wherein the charging coil is one charging coil of a plurality of charging coils of the wireless charging hub; and activating, by the one or more processors, the charging coil that is nearest to the receiver of the device.

2. The method of claim 1, wherein a remaining charging coils of the plurality of charging coils are inactive.

3. The method of claim 1, wherein the determining an approximate location of a receiver of the device comprises:

determining a center of the device based at least in part on the coordinates of the plurality of vertices of the device.

4. The method of claim 1, wherein the determining an approximate location of a receiver of the device comprises:

performing a search of a database based at least in part on the coordinates of the plurality of vertices of the device;

determining, based on a result of the search, that the database includes information associated with the device; and determining the approximate location of the receiver of the device based on the information associated with the device.

5. The method of claim 1, further comprising:

determining, based at least in part on the coordinates of the plurality of vertices of the device, a presence of a second device on the pressure sensitive plate;

determining a gap between the device and the second device;

determining an approximate location of a second receiver in the second device;

determining a second charging coil that is nearest to the second receiver; and activating the second charging coil.

6. The method of claim 1, wherein the identifying a charging coil that is nearest to the receiver of the device comprises:

determining a subset of charging coils from the plurality of charging coils, wherein at least a portion of a particular charging coil of the subset of charging coils is located under the device;

for each particular charging coil of the subset of charging coils:

activating said each particular charging coil;

determining a charge rate of said each particular charging coil; and associating the charge rate with said each particular charging coil; and selecting, from among the subset of charging coils, a charging coil with a highest charging rate.

7. The method of claim 1, further comprising:

determining, based at least in part on the coordinates of the plurality of vertices of the device, that the device is one of a large device or a small device.

8. A wireless charging hub comprising:

a pressure sensitive plate;

a plurality of charging coils; and a base comprising one or more processors and logic, wherein the logic is executable by the one or more processors to perform operations comprising:

detecting that a device has been placed on the pressure sensitive plate;

determining coordinates of a plurality of vertices of the device;

identifying an approximate location of a receiver of the device;

identifying a charging coil of the plurality of charging coils that is nearest to the receiver of the device; and activating the charging coil that is nearest to the receiver of the device without activating remaining charging coils of the plurality of charging coils.

9. The wireless charging hub of claim 8, wherein the identifying an approximate location of a receiver of the device comprises:

performing a search of a database based at least in part on the coordinates of the plurality of vertices of the device;

determining, based on a result of the search, that the database includes information associated with the device; and determining the approximate location of the receiver of the device based on the information associated with the device.

10. The wireless charging hub of claim 8, further comprising:

determining, based at least in part on the coordinates of the plurality of vertices of the device, a presence of a second device on the pressure sensitive plate;

determining a gap between the device and the second device;

determining an approximate location of a second receiver in the second device;

determining a second charging coil that is nearest to the second receiver; and activating the second charging coil.

11. The wireless charging hub of claim 8, wherein the identifying a charging coil of the plurality of charging coils that is nearest to the receiver of the device comprises:

determining a subset of charging coils from the plurality of charging coils, wherein at least a portion of a particular charging coil of the subset of charging coils is located under the device;

for each particular charging coil of the subset of charging coils:

activating said each particular charging coil;

determining a charge rate of said each particular charging coil; and storing the charge rate associated with said each particular charging coil; and selecting, from among the subset of charging coils, a charging coil with a highest charging rate.

12. The wireless charging hub of claim 8, wherein the logic is further configured to perform an operation comprising:

determining, based at least in part on the coordinates of the plurality of vertices of the device, that the device is either a large device or a small device.

13. The wireless charging hub of claim 8, wherein the logic is further configured to perform an operation comprising:

wirelessly transmitting power from the charging coil to the receiver of the device.

14. One or more non-transitory computer-readable storage media comprising logic instructions executable by one or more processors to perform operations comprising:

detecting a presence of a device placed on a pressure sensitive plate of a wireless charging hub;

determining coordinates of a plurality of vertices of the device;

determining an approximate location of a receiver of the device;

identifying a charging coil that is nearest to the receiver of the device, the charging coil is one charging coil of a plurality of charging coils of the wireless charging hub; and activating the charging coil that is nearest to the receiver of the device.

15. The one or more non-transitory computer-readable storage media of claim 14, wherein the determining an approximate location of a receiver of the device comprises:

determining a centroid of the device based at least in part on the coordinates of the plurality of vertices of the device.

16. The one or more non-transitory computer-readable storage media of claim 14, wherein the determining an approximate location of a receiver of the device comprises:

performing a search of a database based at least in part on the coordinates of the plurality of vertices of the device; and determining, based on a result of the search, the approximate location of the receiver of the device.

17. The one or more non-transitory computer-readable storage media of claim 14, the operations further comprising:

determining, based at least in part on the coordinates of the plurality of vertices of the device, a presence of a second device on the pressure sensitive plate;

determining a gap between the device and the second device;

determining an approximate location of a second receiver in the second device;

determining a second charging coil that is nearest to the second receiver; and activating the second charging coil.

18. The one or more non-transitory computer-readable storage media of claim 14, wherein the identifying a charging coil that is nearest to the receiver of the device comprises:

determining a subset of charging coils from the plurality of charging coils, wherein at least a portion of a particular charging coil of the subset of charging coils is located under the device;

for each particular charging coil of the subset of charging coils:

activating said each particular charging coil for a predetermined amount of time;

determining a charge rate of said each particular charging coil; and storing the charge rate with said each particular charging coil; and selecting, from among the subset of charging coils, a charging coil with a charging rate that satisfies a predetermined threshold.

19. The one or more non-transitory computer-readable storage media of claim 14, further comprising:

determining, based at least in part on the coordinates of the plurality of vertices of the device, that the device is one of a large device or a small device.

20. The one or more non-transitory computer-readable storage media of claim 14, further comprising:

deactivating remaining charging coils of the plurality of charging coils.

* * * * *